United States Patent [19]

Michaelsen et al.

[11] 4,245,008
[45] Jan. 13, 1981

[54] CORROSION RESISTANT MAGNETIC RECORDING MEDIA

[75] Inventors: John D. Michaelsen, Los Gatos; Daniel A. Nepela; Peter B. P. Phipps, both of Saratoga, all of Calif.

[73] Assignee: International Business Machines Corporation, Armonk, N.Y.

[21] Appl. No.: 956,296

[22] Filed: Oct. 30, 1978

[51] Int. Cl.³ ............................................. B32B 15/04
[52] U.S. Cl. .................................... 428/611; 365/171; 428/678; 428/681; 428/928
[58] Field of Search ............... 428/611, 928, 681, 682, 428/683, 684, 685, 678, 679; 75/126 H, 171; 365/171

[56] References Cited

U.S. PATENT DOCUMENTS

| 3,206,325 | 9/1965 | Averbach | 427/132 |
| 3,588,764 | 6/1971 | Olsen et al. | 75/126 H |
| 4,028,144 | 6/1977 | Tomishima et al. | 75/171 |
| 4,079,169 | 3/1978 | Nigh et al. | 428/678 |

FOREIGN PATENT DOCUMENTS 288674  4/1928  United Kingdom ................... 428/684

OTHER PUBLICATIONS

Bozorth, R. M., *Ferromagnetism*, D. Van Nostrand Co., N.Y., pp. 226–227, (1951).

Primary Examiner—L. Dewayne Rutledge
Assistant Examiner—Michael L. Lewis
Attorney, Agent, or Firm—Walter J. Madden, Jr.

[57] ABSTRACT

A thin film magnetic recording medium for deposition on a record carrier includes a ferromagnetic alloy containing iron, cobalt and chromium. The ferromagnetic alloy consists of from 0–55% cobalt, from 8–22% of chromium with the remainder iron. The preferred range of chromium is from 10–18%. The magnetic recording layer is vacuum deposited over an extended portion of a record carrier for storing information which is represented by the spatial distribution of magnetic transitions in the magnetic layer. The iron-cobalt-chromium or iron-chromium composition according to this invention, gives the best magnetic properties consistent with excellent corrosion resistance.

6 Claims, 12 Drawing Figures

| Ref # | Composition Atomic % | | | Thickness Å | Undercoat Type | Undercoat Thick. Å | Magnetic Properties Hc Oe | Ms emu/g | Mr emu/g | S | Corrosion |
|---|---|---|---|---|---|---|---|---|---|---|---|
| | Fe | Co | Cr | | | | | | | | |
| 1.1 | 25 | 71 | 4 | 3400 | Glass | | 200,270 | 1300 | 550 | .45 | 1000 |
| 1.2 | 21 | 72 | 7 | 5350 | | | 150,220 | 1230 | 700 | .57 | 100 |
| 1.3 | 19 | 67 | 14 | 5100 | | | 110,110 | 1050 | 670 | .63 | 40 |
| 1.4 | 17 | 56 | 27 | 5800 | | | 107,130 | 600 | 480 | .78 | 13 |
| 1.5 | 42 | 54 | 4 | 6100 | | | 125,175 | 1400 | 800 | .57 | 1200 |
| 1.6 | 40 | 52.6 | 7.4 | 5333 | | | 70,065 | 1350 | 1103 | .84 | 55 |
| 1.7 | 35 | 48 | 17 | 5850 | | | 70,075 | 1040 | 900 | .85 | 12 |
| 1.8 | 28 | 40 | 32 | 5850 | | | 72,095 | 610 | 520 | .85 | 7 |
| 1.9 | 63 | 32.5 | 4.5 | 5850 | | | 85,105 | 1380 | 1030 | .75 | 900 |
| 1.10 | 62 | 30 | 8 | 3500 | | | 42,045 | 1300 | 1100 | .85 | 40 |
| 1.11 | 55 | 28 | 17 | 5000 | | | 65,100 | 1020 | 780 | .75 | 10 |
| 1.12 | 43 | 26 | 31 | 4600 | | | 80,090 | 620 | 255 | .81 | 5 |
| 2.1 | 25 | 71 | 4 | 290 | AlMg | | 90 | | | | |
| 2.2 | 21 | 72 | 7 | 290 | AlMg | | 80 | | | | |
| 2.3 | 42 | 54 | 4 | 290 | AlMg | | 125 | | | | |
| 2.4 | 40 | 52.6 | 7.4 | 290 | AlMg | | 45 | | | | |
| 2.5 | 63 | 32.5 | 4.5 | 290 | AlMg | | 70 | | | | |
| 2.6 | 62 | 30 | 8 | 290 | AlMg | | 40 | | | | |
| 3.1 | 25 | 71 | 4 | 290 | Ti | 2000 | 275 | | | | |
| 3.2 | 21 | 72 | 7 | 290 | Ti | 2000 | 180 | | | | |
| 3.3 | 42 | 54 | 4 | 290 | Ti | 2000 | 250 | | | | |
| 3.4 | 40 | 52.6 | 7.4 | 290 | Ti | 2000 | 100 | | | | |
| 3.5 | 63 | 32.5 | 4.5 | 290 | Ti | 2000 | 250 | | | | |
| 3.6 | 62 | 30 | 8 | 290 | Ti | 2000 | 90 | | | | |
| 4.1 | 91 | | 9 | 400 | Ti | 3000 | 200 | 1180 | | .95 | |
| 4.2 | 94 | | 6 | 350 | TiCrPd | 3000 | 280 | 1230 | | .95 | |
| 4.3 | 88 | | 12 | 350 | TiCrPd | 3000 | 280 | 1120 | | .95 | |
| 4.4 | 96 | | 4 | 300 | Ti | 4000 | 340 | 1265 | | .97 | |
| 4.5 | 90 | | 10 | 300 | Ti | 4000 | 340 | 1160 | | .97 | |
| 4.6 | 89 | | 11 | 400 | Co | | 380 | 1140 | | .92 | |
| 4.7 | 89 | | 11 | 400 | Glass | | 280 | 1140 | | .90 | |
| 4.8 | 84 | | 16 | 400 | Co | | 260 | 1050 | | | |
| 4.9 | 65 | | 35 | 400 | | | 80 | 700 | | | |

FIG. 3A

| Ref # | Composition Atomic % | | | Thickness Å | Hc | MrT | Rate | Temp °C | Angle |
|---|---|---|---|---|---|---|---|---|---|
| | Fe | Co | Cr | | | | | | |
| 1.1 | 43.5 | 43.5 | 13 | 450 | 370 | 4.9 | 6 | | |
| 1.2 | 43.5 | 43.5 | 13 | 450 | 420 | 3.9 | 6 | | |
| 1.3 | 43.5 | 43.5 | 13 | 450 | 350 | 4.3 | 6 | | |
| 1.4 | 43.5 | 43.5 | 13 | 450 | 370 | 4.9 | 6 | | |
| 1.5 | 43.5 | 43.5 | 13 | 450 | 390 | 4.5 | 6 | | |
| 1.6 | 43.5 | 43.5 | 13 | 450 | 350 | 5.0 | 6 | | |
| 1.7 | 43.5 | 43.5 | 13 | 450 | 410 | 3.3 | 6 | | 80 |
| 1.8 | 43.5 | 43.5 | 13 | 450 | 330 | 4.3 | 6 | 200 | |
| 1.9 | 43.5 | 43.5 | 13 | 450 | 330 | 3.9 | 10 | | |
| 1.10 | 43.5 | 43.5 | 13 | 750 | 240 | 8.3 | 6 | | |
| 2.1 | 39.5 | 39.5 | 21 | 750 | 170 | 3.7 | | | |
| 2.2 | 39.5 | 39.5 | 21 | 750 | 230 | | | | 70 |
| 2.3 | 39.5 | 39.5 | 21 | 600 | 250 | | | | 80 |
| 3.1 | 41.5 | 41.5 | 17 | 300 | 190 | 2.7 | 4 | 125 | 50 |
| 3.2 | 41.5 | 41.5 | 17 | 300 | 360 | 2.5 | 8 | 125 | 70 |
| 3.3 | 41.5 | 41.5 | 17 | 300 | 320 | 2.6 | 4 | 175 | 50 |
| 3.4 | 41.5 | 41.5 | 17 | 300 | 200 | 2.8 | 8 | 175 | 50 |
| 3.5 | 41.5 | 41.5 | 17 | 600 | 310 | 3.9 | 4 | 125 | 70 |
| 3.6 | 41.5 | 41.5 | 17 | 600 | 260 | 5.3 | 8 | 125 | 70 |
| 3.7 | 41.5 | 41.5 | 17 | 600 | 250 | 6.7 | 4 | 175 | 70 |
| 3.8 | 41.5 | 41.5 | 17 | 600 | 290 | 4.6 | 8 | 175 | 70 |

| NO. | COMPOSITION ATOM % | | | BULK PROPS | | FILM PROPS | |
|---|---|---|---|---|---|---|---|
| | Fe | Co | Cr | MAGNETIC  $T_c°C$ | PHASE | MAGNETIC | PHASE |
| 1 | 40 | 40 | 20 | Non-Magnetic $T_c$<-195 | HEX | Magnetic | BCC |
| 2 | 45 | 45 | 10 | Magnetic | BCC | Magnetic | BCC |
| 3 | 41.5 | 45 | 13.5 | | | Magnetic | BCC |
| 4 | 36 | 38 | 26 | | | Magnetic | BCC |
| 5 | 29 | 31 | 40 | | | Magnetic | BCC |
| 6 | 30 | 55 | 15 | Non-Magnetic -14±5 | HEX | Magnetic | |
| 7 | 42.5 | 42.5 | 15 | Non-Magnetic | HEX+BCC | Magnetic | BCC |
| 8 | 50 | 50 | 0 | Magnetic | BCC | Magnetic | BCC |

CORROSION RESISTANT MAGNETIC RECORDING MEDIA

DESCRIPTION

1. Technical Field

This invention relates generally to a magnetic recording coating, and more particularly to a thin film magnetic layer, on which data is stored in the form of spatially discrete areas, the magnetization of which can be controlled and sensed individually.

The present invention is directed to magnetic record members used for the storage of data information. This information is translated into a code, the elements of which are the direction of the magnetization of discrete areas of a magnetic medium. The information is retrieved by readout devices such as magnetic heads, which sense the direction of the magnetization retained in any of these discrete areas. The magnetic record members involved may be those such as tape, drum or other forms which support a thin film layer of magnetic recording medium.

In order to store large quantities of information, the areas storing each element of information must be small. The distinction of the magnetization of one small area of the magnetic medium from that of contiguous areas generally requires that the magnetic sensing device be placed close to the desired element. This necessitates a precisely defined surface geometry. A high retrieval rate demands a high relative velocity between the medium and the read/write head, and this in turn requires precise surface geometry. The greater the quantity of magnetic information that can be readily stored for distinctive output and the greater the area useful for the storage of the magnetic information, the better the economy and usefulness of the magnetic recording medium. To store the maximum quantity of magnetic information, the magnetic properties of the recording medium must have critical magnetic and geometric characteristics. These properties must be retained while subject to friction in atmospheres which may contain constituents which corrode metals.

It is well known that a magnetic recording device could be prepared which includes a ferromagnetic layer composed of iron oxide powder in a binder, or in the form of a thin metallic film generally of iron, nickel, and cobalt or an alloy thereof. The iron oxide particulate magnetic medium has good corrosion and recording properties and has been capable of providing a recording density sufficient up to the present time. Now, however, it has been found that thin film magnetic layers can be magnetized by a magnetic transducer to a much higher magnetic transition density such that a magnetic medium can contain more transitions per unit length of media. Most metals suffer attack by atmospheric corrosion at a rate which is serious compared with the dimensions of the recording medium. Generally this makes the magnetic film unusable as a recording medium.

Atmospheric corrosion can affect the record member in several ways. It can cause conversion of the magnetic medium into nonmagnetic salts. It is commonly observed that corrosion of the magnetic medium, any undercoat, or overcoat, or the substrate is concentrated at small areas. The pits, or the corrosion products around them, disrupt the smooth surface which has been shown above to be necessary for the performance of high density recording. Contact between the head and the rapidly moving medium can be very harmful.

The susceptibility of a medium to corrosion is profoundly affected by the materials with which it is in contact. This is known to those skilled in the art as "galvanic corrosion". Thus, the selection of materials for the magnetic medium, the record holder and all other materials which make contact with them, is profoundly constrained individually, and collectively as a structure, by the effects of atmospheric corrosion.

Some metals achieve corrosion resistance by the formation of a layer of impervious reaction product. In the recording environment, such surfaces must withstand the added demand of the frictional wear of the read/write head.

It is believed that the susceptibility of thin magnetic film structures to corrosion is the reason that the thin magnetic films are not in widespread use, although known for a substantial period of time.

It is an object of the present invention, therefore, to provide a thin film magnetic medium for use in recording, with excellent corrosion resistance.

Besides the smoothness and the ability to retain the smoothness after atmospheric exposure, the magnetic medium must have critical magnetic characteristics in order to store usable information in the maximum density. Important magnetic characteristics which are involved in this invention are outlined below.

The magnetization M (gauss or emu/cm$^3$ in c.g.s units) of a ferro-or ferrimagnet is dependent on the magnetic field strength H (oersteds in c.g.s units). At a sufficient field, the local moments are all aligned and the magnetization is a characteristic of the material, the saturation magnetization—$M_s$. When the field is reduced to zero, the magnetization drops—only modestly in a suitable sample—to a remanant magnetization $M_r$. The loop squareness $S = M_r/M_s$. If the field is reduced to $H = -H_c$, the magnetization drops to zero and a still more negative field induces negative saturation magnetization. $H_c$ is the magnetic coercivity.

Information is stored in the magnetic record by the direction of the remnant magnetization. The smallest distance between stored bits of information is affected by the ratio of the $M_r$ to the coercivity $H_c$. High $H_c$ is thus desirable in maximizing the information density and the sense signal which is increased by a high rate of change of flux density in inductive sensing, and in resisting magnetic degradation by stray magnetic fields. The maximum $H_c$ is limited by the write operation magnetics. A high $M_r$ also enhances the read signal.

It is, therefore, an object of the present invention to provide an improved magnetic recording member suitable for use in a recording system with desirable magnetic characteristics for improved recording and reproducing characteristics by a magnetic head.

The term "thin film" is used herein according to its common technical meaning, i.e., to designate a film having a thickness of 10,000 Angstrom units or less. The magnetic recording medium of the present invention should also be differentiated from arts which use the magnetic oxide type of particulate recording medium instead of the thin magnetic and metallic film of the present invention. The concept of this invention should further be distinguished from other areas of magnetic recording media such as, for example, "soft" media known in the art generally as a Permalloy material, where the intrinsic coercivity is under 50 oersteds.

Yet another object of the present invention, therefore, is to provide an enhanced ferromagnetic alloy as the magnetic layer for a recording medium.

Still another object of this invention is to provide a ferromagnetic alloy for a recording medium that has enhanced magnetic properties and corrosion resistance.

These and other object of the present invention will become apparent to those skilled in the art as the description proceeds.

2. Background Art

Ferromagnetic materials of iron-chromium and iron-cobalt-chromium are known in the prior art as evidenced by the referenced book, *Ferromagnetism* by Richard M. Bozorth, published by Van Nostrand, 1951. In the sixth printing, at page 226–9, iron chromium and its bulk properties are disclosed including a phase diagram of the iron-chromium alloy. The iron-cobalt-chromium alloy is discussed in this book at pages 206–7. The properties of the different alloys are well known as evidenced by these references. What is not known or made obvious by this book or other such publications is the knowledge that a thin film of these alloys can be deposited with properties which are needed for magnetic recording.

It is, therefore, an object of the present invention to provide a magnetic recording medium wherein the magnetic layer comprises a thin film of an alloy of iron-cobalt-chromium or an alloy of iron-chromium.

Further prior art for the use of a magnetic alloy of iron-cobalt-chromium is U.S. Pat. No. 2,442,219 issued to James K. Stanley on May 25, 1948. In this patent, the chromium content is from 0.30% to 0.55%. Again, the magnetic alloy is for use in a bulk form and no disclosure is made of a thin film alloy having a higher chromium content.

Another object of this invention, is to provide a magnetic alloy for use as a magnetic medium in a recording system where the chromium content of the alloy is in excess of 8% atomic weight.

U.S. Pat. No. 3,414,430 discloses a vacuum evaporated magnetizable coating of iron-cobalt-chromium wherein the chromium content is on the order of 0.5%. The magnetic coating is for a magnetic signal storing element such as rigid or flexible support of tape, disk or drum form. The chromium content of the ferromagnetic alloy of this patent is on the order of 0.5% of chromium. Other magnetic alloys such as iron-nickel-aluminum and iron-nickel molybdenum are also disclosed.

A further U.S. Pat. No. 3,206,325 issued to B. L. Averbach discloses a thin film ferromagnetic layer of a magnetic recording structure wherein the coating comprises from 30 to 70% iron; from 30 to 70% of a metal selected from the class consisting of cobalt and nickel; and from 0 to 40% at least one metal selected from a class wherein chromium is one metal cited. A trace to 3% of a nonmetal selected from the class consisting of carbon and oxygen is included. Disclosed in the examples are magnetic coatings of 90.5% iron and 1.5% carbon; 59% iron, 24% cobalt, 14% nickel and 3% carbon; and 49% iron, 24% cobalt, 14% nickel, 8% aluminum, 3% copper and 1% carbon. No disclosure is made of a thin film magnetic recording medium layer wherein chromium is included as a workable metal for inclusion with iron or iron-cobalt to form a ferromagnetic layer having properties usable for recording transitions forming data information.

A further object of this invention, therefore, is to provide a magnetic recording layer that is vacuum deposited onto a recording carrier for forming a magnetic recording layer that is capable of storing magnetic transitions representative of data information over an extended portion of the layer, the layer comprising a ferromagnetic alloy consisting of from 0–55% cobalt, from 8–22% chromium, with the remainder iron.

BRIEF DESCRIPTION OF THE DRAWINGS

The various novel features of this invention, along with the foregoing and other objects, as well as the invention itself both as to its organization and method of operation, may be fully understood from the following description of the illustrated embodiments when read in conjunction with the accompanying drawing, wherein.

DISCLOSURE OF THE INVENTION

In accordance with the present invention, a new thin film metal magnetic layer for a recording disk comprises an iron-cobalt-chromium composition or an iron-chromium composition. The magnetic alloy layer is vacuum deposited onto a recording carrier. The preferred deposition process is by evaporation in a vacuum using electron beam heating with the deposition occurring at an oblique angle to the plane of the substrate for enhancement of the coercive force of the magnetic alloy. The magnetic recording layer is vacuum deposited over an extended portion of a record carrier. The magnetic transitions, which represent the information which is to be stored, are transitions in the remanent magnetization of the magnetic thin film.

The ferromagnetic alloy for the recording medium can comprise either iron-chromium or iron-cobalt-chromium. The magnetic recording layer can, therefore, comprise a ferromagnetic alloy consisting of from 0–55% cobalt, from 8–22% chromium, with the remainder iron.

Figure 1:
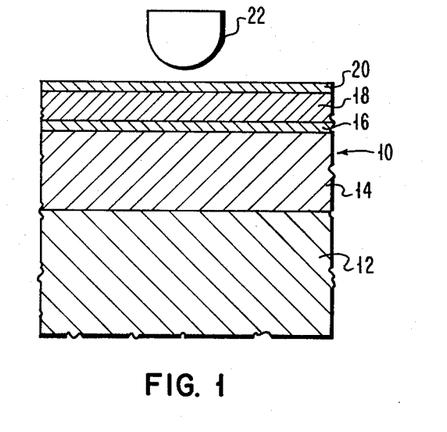
FIG. 1 is a sectional diagram of a magnetic recording device with a magnetic layer according to the present invention.

Referring to FIG. 1, a new thin film magnetic recording medium 10 is shown composed of a nonmagnetic substrate 12, a clad layer 14, possibly an undercoat layer 16, a magnetic layer 18 and an overcoat protective layer 20 primarily for wear protection. In the preferred embodiment, the magnetic recording medium will be described in the form of magnetic record disks suitable for use with readout mechanisms such as a flying magnetic head 22 which is spaced adjacent to the magnetic record medium 10 for purposes of either writing upon or reading out signals from the magnetic layer 18 of the magnetic record medium.

The magnetic recording medium 10 of FIG. 1 preferably comprises an aluminum alloy as the substrate 12, although other nonmagnetic metals and plastic or glass are suitable substitutions. The aluminum alloy substrate is sufficiently thick, e.g. 0.32 centimeter or 0.128 inch, to provide and maintain uniform flatness and mechanical rigidity of the disk for use with the closely spaced recording head. The surfaces of the substrate 12 are finished to provide an extremely smooth surface to eliminate asperities.

The clad layer 14 is deposited over the substrate, and its surface is made as smooth as possible. The clad layer 14 is preferably of a nonmagnetic corrosion resistant alloy such as stainless steel to provide a durable record carrier and to protect the aluminum substrate from corrosion. A preferred clad layer 14 is a cobalt based superalloy as discussed in U.S. Pat. No. 4,079,169 assigned the assignee of the present invention. Other useful clad layers are titanium and all non-magnetic stainless steels including nickel-chromium alloys. In order to obtain a smoother surface, the clad layer 14 is generally deposited in two steps with a polishing step between the deposition of the nonmagnetic metal layer. The deposition is preferably by vacuum deposition such as by sputtering as discussed in that patent. The undercoat layer 16 may or may not be used depending upon the material used as the clad layer 14.

The undercoat layer 16, if used, is preferably a thin layer of chromium or titanium or an alloy of chromium and titanium. The undercoat layer 16 is preferably vacuum deposited by sputtering to a thickness of from 500-5000 Angstroms. The purpose of the undercoat layer 16 is to enhance the magnetic properties of the subsequently deposited magnetic layer 18. If the clad layer 14 itself provides this enhancement property, the undercoat layer 16 need not be deposited between the clad layer 14 and the magnetic recording layer 18.

The magnetic recording layer 18 according to the present invention is composed of a ferromagnetic alloy of iron, cobalt, and chromium. The new magnetic thin film recording medium comprises from 0-55% cobalt, from 8-22% chromium with the remainder iron. The magnetic medium is preferably vacuum deposited to a thickness of from 200-500 Angstroms. The preferred deposition process is by electron beam heating in a vacuum. A protective layer 20 of a hard and corrosion resistant material such as rhodium can be deposited over the magnetic layer 18. The overcoat layer 20 serves the purpose of protecting the magnetic layer from wear during start and stop operation, and when the head 22 occasionally loses its flying characteristics and comes into intermittent contact with the magnetic recording medium. The overcoat layer 20 is preferably vacuum deposited to a thickness of from 300-500 Angstroms by sputter deposition.

Figure 2:
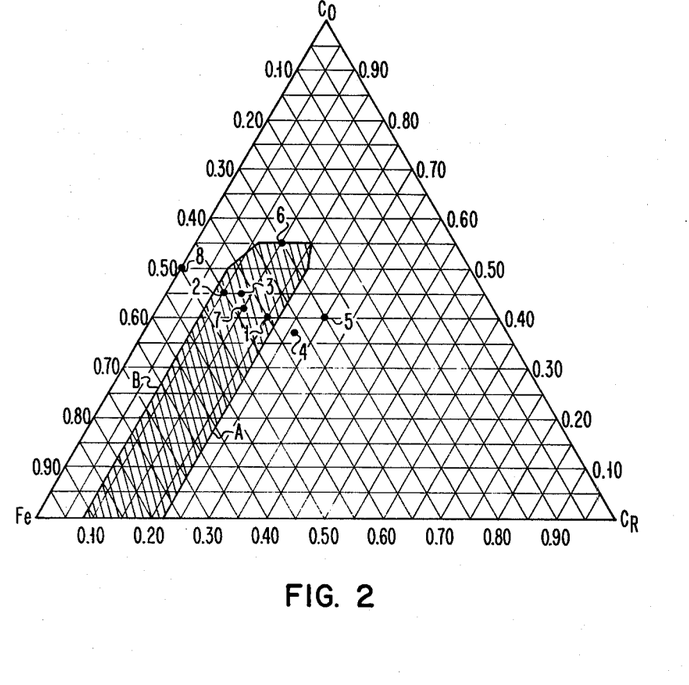
FIG. 2 is a ternary composition diagram in atomic fractions with the crosshatch showing alloy concentration according to the present invention.

The preferred composition range of the magnetic thin film layer 18 is shown in the crosshatched portion of the ternary diagram of FIG. 2. The composition disclosed within the crosshatch of FIG. 2 is not to be taken to mean that slight variation from the percentages of iron, cobalt and chromium would not operate as a magnetic recording medium. In this figure, according to the corrosion tests and magnetic tests performed, the magnetic medium most preferred as meeting the criteria set is that within the crosshatched region of FIG. 2. The composition diagram shown summarizes the effect of the chromium dilution on the corrosion threshold, curve B, and the magnetic properties in curve A.

A magnetic film for high density recording can be obtained with a ferromagnetic alloy of iron and chromium without the addition of cobalt. The functional magnetic recording properties are obtained with a chromium content between 8-22 atomic weight percent of chromium. The iron-chromium binary alloy permits easier control of the chemical composition of the deposited films. Values outside of the chromium range can be used if mild operating environments are insured, and if the undercoat layers are chosen to enhance the magnetic properties. The undercoat layer influences the coercivity of the thin magnetic films produced. Thermodynamic calculations indicate that the difficulties in controlling the depletion of the more volatile chromium during deposition would be less severe in the binary alloy than for the magnetic comparable ternary alloy of iron-cobalt-chromium. Experimentally, a depletion was found to be a low 0.18 percent by weight of chromium per 1000 Angstroms of iron-chromium deposited.

EXAMPLE 1

A magnetic recording medium was made in the form of a disk using an aluminum alloy substrate with a clad layer and a thin film of chromium as an undercoat layer. The chromium undercoat layer was deposited to a thickness of 1000 Angstroms. The deposition technique used was evaporation using electron beam heating in a technical vacuum, pressure of approximately $2 \times 10^{-6}$ Torr. The source of iron-chromium contained 5% by weight of chromium. The deposition was at an angle of incidence between 65°-71° from the normal. The substrate temperature was held between 150°-200 C. The instantaneous deposition rate was approximately 15 angstroms per second. The iron-chromium was deposited to a thickness of 300 Angstroms and the thin film contained 14.5% by weight of chromium. The magnetic properties of the iron-chromium according to this deposited film were: coercivity of between 250-380 oersteds, magnetic moment $M_r$ of approximately $1.2 \times 10^{+3}$ emu/cc, and a squareness ratio of greater than 0.95.

The iron-chromium films with a chromium content of greater than 8% by weight chromium showed no detectable corrosion by weight gain measurement after exposure to corrosive gases.

Metallic magnetic thin films for high density inductive magnetic recording must exhibit certain magnetic properties. First, the magnetic film must have a high magnetic moment such that the product of remanence times thickness is in excess of $1.0 \times 10^{-3}$ emu/cm$_2$ for a film having a thickness of a few hundred angstroms to produce sufficient magnetic flux to be read by a magnetic transducer. Second, the magnetic thin film must have a hysteresis loop with a high squareness ratio, in excess of 0.90, to provide good magnetic switching characteristics. Third, the magnetic thin film must have a coercivity of between 300–800 oersteds to produce the necessary amplitude and resolution for a given film thickness and magnetization. Besides these basic magnetic qualities, the film must be corrosion resistant and should also have a low magnetostriction constant so as not to suffer signal loss from mechanical impact. In order to meet all of these conditions, a multicomponent alloy must be designated. The ternary alloy of iron-cobalt-chromium as taught in the present application meets these conditions. Further, an iron-chromium alloy is suitable.

The selection of a material for magnetic recording is guided by several constraints. The material must have appropriate chemical (and phase) stability, durability, and recording characteristics. Some of these constraints are explicit functions of the composition; e.g. the magnetic moment of an alloy; some are affected by process parameters—e.g., the magnetic coercivity of films is affected by the angle at which the vapor is incident on the substrate,, and by adventitious impurities such as carbon and oxygen as well as being affected by the alloy composition.

The lowest chromium content which is acceptable is set by corrosion. The upper chromium content is set by magnetic properties which become marginal for chromium content beyond 22% (see FIG. 9). The signal amplitude drops to an undesirably low level for any chromium content greater than 22% and it becomes very sensitive to fluctuations in the chromium content. Thus, there is a decrease in signal and an increase in noise for any greater concentration than 22% Cr.

Figure 3A:
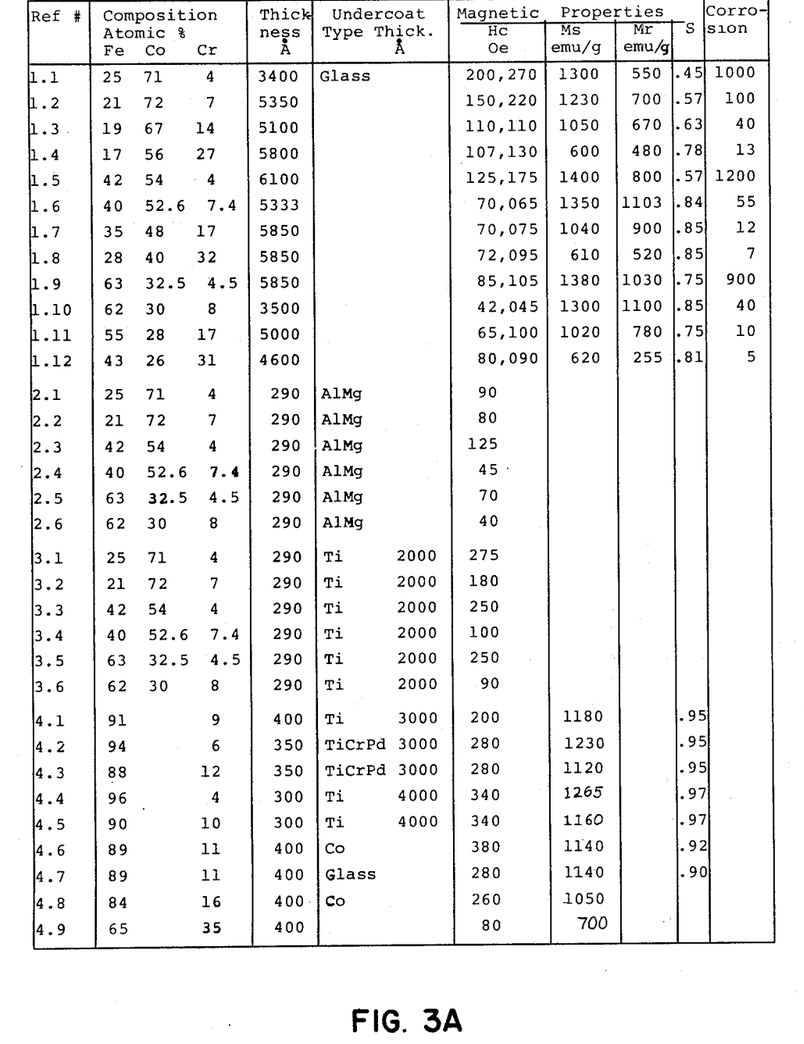
FIGS. 3A and B are a list of Examples with related magnetic and corrosion properties of the alloy according to the present invention.

All of the samples for the iron-chromium magnetic thin films shown in FIG. 3A at reference numbers 4.1 to 4.9 were deposited under the following conditions: temperature—$165 \pm 2°$ C; deposition rate—$60+10$ Angstroms per second; vacuum of $1—3 \times 10^{-6}$ Torr; film thickness of 300–500 Angstroms; using an electron beam deposition process with the deposition being performed at an angle of incidence of between 55–75%.

The magnetic measurements of the deposited film were made in a vibrating sample magnetometer, VSM, in a magnetic field of up to 1250 gauss. Coercivities were measured with an accuracy of $\pm 20$ oersted and the saturation magnetization within $\pm 5\%$. The analysis of the iron and chromium content was performed by an electron micro probe technique.

A magnetic characteristic needed from the deposited films is the saturation magnetization which is intrinsic to a composition. The coercivity and the shape of the loop are also of interest. For the examples set forth in FIG. 3A, and 3B the magnetic quantities of those taken were measured by the vibrating sample magnetometer (VSM). The precision of the measurement is limited by the difficulty of measuring the thickness and density of the film and by the diamagnetic correction due to the substrate.

The loops of the thicker films were measured on the VSM thereby increasing the signal from the material relative to that of the substrate, and also increasing the precision of thickness measurements. The VSM measurements of magnetization may be compared with those of the thin films of the same nominal composition by scaling the moment according to the duration of the deposition. Although these measurements may yield the magnetization associated with a given composition, parameters of loop shape have to be measured directly on the thin film. Another test used to measure the magnetic data was the magneto-optic effect. The Kerr effect yielded coercivity data and a Faraday magneto-optic method was used to measure the magnetization. The longitudinal Kerr effect provides a means of measuring the M-H loops of the magnetic film. Plane-polarized light is reflected from the surface, such that the direction of the magnetization in the plane lies in the plane of incidence. The rotation and ellipticity induced by ordinary reflection are modified by the magnetization. Thus, the coercivity of the film can be measured. The Faraday rotation method was used to measure the saturation magnetization of the thin magnetic films without requiring the measurement of the film thickness or the Verdet constant of the material being studied. Plane-polarized light is directed parallel to an applied field which is normal to the surface of the film. The rotation of the plane of polarization is proportional to the magnetization normal to the plane and to the film thickness. The magnetization lies in the plane, hence rotation was negligible in the absence of an applied field. The field is increased until the threshold is reached at which the optical rotation does not increase with increasing field. Thus, the threshold is equal to the demagnetizing field $H = 4\pi M_s$. The magnetization derived from the Faraday effect is very close to that obtained by the VSM.

Figure 3B:
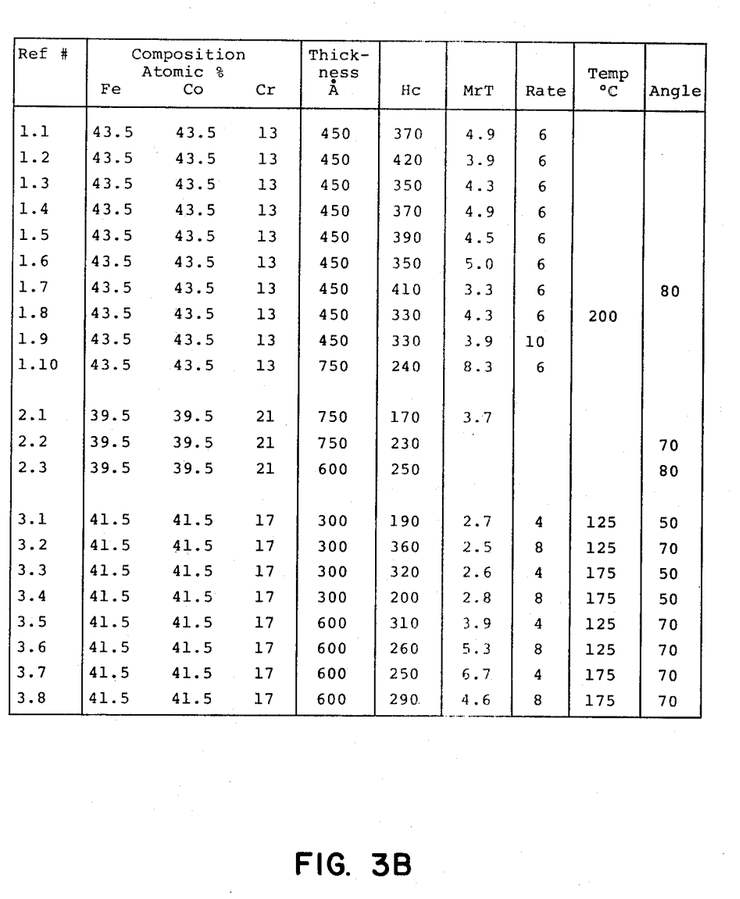

Other examples of magnetic media and their resultant magnetic properties are given in the examples of FIG. 3A and 3B. The composition of the resultant films are given for each material in approximate atomic percentages. The thickness of a film as measured is given in Angstrom units. Since the undercoat has an effect on the magnetic properties of the film, the undercoat type that the magnetic alloy was deposited on was given and the thickness of the undercoat, where appropriate is also given. Generally, the coercive force $H_c$ was measured for all examples. Other magnetic properties were measured for some of the examples.

In FIG. 3A, the effect of the substrate on the coercivity can be shown by the comparing examples of reference #2.X and 3.X. The composition of 2.1 to 2.6 were deposited on an aluminum substrate and resulted in a low coercivity material. The same compositions were deposited on a titanium layer and each showed a marked increase in coercivity. The angle of deposition for the magnetic material also has an effect on the coercivity. For instance, reference numbers 1.1 to 1.12 compositions were films deposited by a sputtering process. The coercivities of these films are therefore lower since the angle of incidence is not controllable in a sputtering system. The other examples such as shown in the compositions of reference numbers 3.1 to 3.6 showed an increase in the coercivity since these films were deposited in an electron beam heating deposition system at an angle of incidence greater than 45°.

The U.S. Pat. No. 3,342,632 to G. Bate et al and assigned to the assignee of this invention discloses the effect of an oblique angle vacuum deposition on the magnetic properties of a magnetic recording media. The oblique deposition angle is required at present to obtain good magnetic property for use of the film as a magnetic recording media. Less corrosion would be expected from the same film composition if similar magnetic properties could be obtained from a deposition at a normal angle of incidence.

FIG. 3B shows further examples of the composition for iron-cobalt-chromium as a magnetic recording layer. The reference numerals are grouped according to process parameters. For instance, reference #1.1 to

1.6, the composition of the alloy and the thickness of the deposited film were held constant. The composition of the alloy was 43.5 atomic percent iron, 43.5 atomic percent of cobalt, and 13 atomic percent of chromium all deposited to a thickness of 450 Angstroms. The magnetic properties measured for these films are the coercivity $H_c$ in oersteds and the remanent function $M_rT$ which is given in milli emu units per centimeter square. For the composition of reference #1.1 to #1.6 and #1.8 to #1.12, the deposition was by electron beam heating at an angle of incidence of 60° with a deposition temperature of 150° centigrade at a deposition rate of 6 Angstroms per second. Reference #1.7 was processed in the same manner as the preceding composition except that the angle of deposition was placed at 80°. Reference #1.8 was deposited with the same conditions as for reference #1.1 to #1.6 except that the temperature of the substrate was put at 200° C. Reference #1.9 was similarly processed except at a rate of 10 Angstroms per second while the composition of reference #1.10 was deposited to a thickness of 750 Angstroms using the same process as above. The magnetic properties resulting from these compositions gave good results for material usable as a magnetic recording media.

Reference #2.1–#2.3 show examples of a composition where the atomic percentage of iron and cobalt were 39.5% and the atomic weight percentage of chromium was 21%. The same process as for reference #1.1 to #1.6 was used except for a different thickness as shown in FIG. 3B.

For reference #2.2 and #2.3, the thickness deposited was as noted and the deposition angle was 70° and 80° respectively. These groups of compositions show that the coercivity increases as the angle of deposition increases. The composition for reference #3.1 to #3.8 were 41.5 atomic weight percentage of iron and cobalt and a 17 atomic weight percentage of chromium. Various magnetic recording layers of these examples were deposited to a thickness of 300 and 600 Angstroms. The deposition rate substrate temperature and angle of deposition were as noted in FIG. 3B. The resultant coercivity again shows that the film of these compositions contains magnetic properties suitable for usage as magnetic recording media.

Figure 4:
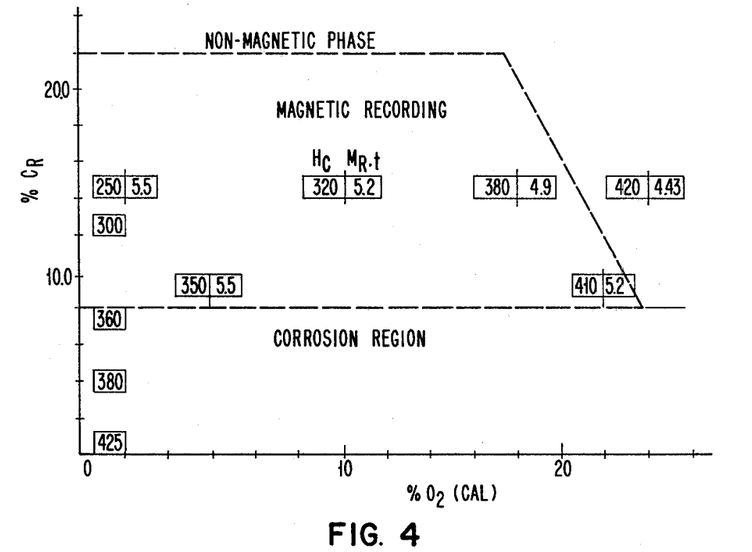
FIG. 4 is a graph showing the effect of oxygen on the magnetic properties of a recording media over an alloy concentration within the range of this invention.

FIG. 4 shows the magnetic properties of a magnetic recording media over a range of chromium within the present invention and the effect of oxygen within the deposition chamber. The first or only number shows within a block over various chromium and oxygen ranges is the coercive force $H_c$ given in oersteds. The second number is the product of the remanence times the layer thickness given in $10^{-3}$ emu/cm$^2$ units. The iron and cobalt in the composition are equal to make up the 100% by atomic weight percentage together with the chromium atomic weight percentage shown. Thus, the preferred composition of this invention includes approximately 42.5 atomic weight percentage of iron and approximately 15 atomic weight percentage of chromium.

As shown and taught by FIG. 4, the more the oxygen content in the deposition chamber, the higher the coercive force and the lower the remanence product. For the examples shown in FIG. 4, the magnetic layer was deposited by electron beam heating in a vacuum, pressure of from 1 to $5 \times 16^{-6}$ Torr at a 60° oblique angle. The thickness of the deposited layer was 500 Angstroms nominal, plus or minus 10%. The deposition rate was 12 Angstroms per second and the temperature of the substrate during the deposition was 200° C. with a range of plus 10° C. and minus 30°. The magnetic layer was deposited onto a layer of the cobalt super alloy undercoat. An overcoat layer of approximately 400 Angstroms of rhodium was deposited over the magnetic layer before the magnetic tests were run.

The useful range for a magnetic recording media of the percentage of added chromium is shown as from 8 to 22% in FIG. 4 within the dashed lines. The calculated amount of oxygen present in the deposition chamber is up to 24% for a useful magnetic layer for recording purposes. Too high an oxygen content lowers the remanence product. The resolution of the output signal from a magnetic recording layer is proportional to the coercive force of the layer divided by its remanence product. The amplitude of the signal is proportional to the coercive force times the remanence product which is the product of the remanence times the thickness of the layer.

Figure 5:
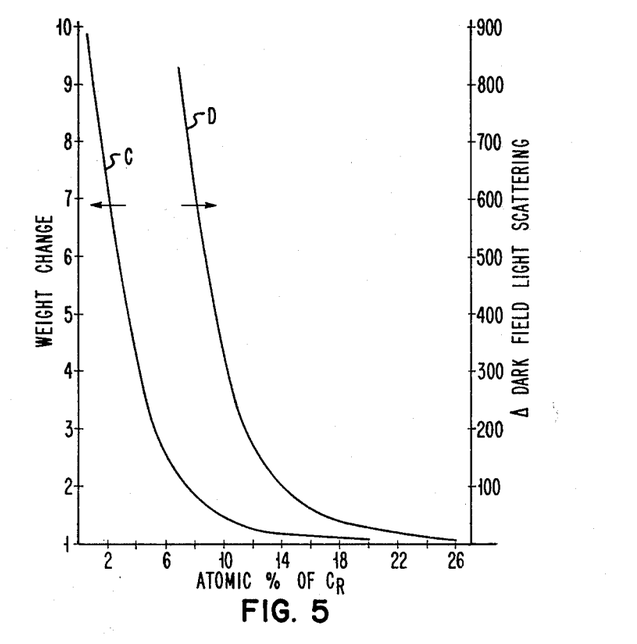
FIG. 5 is a graph of corrosion tests on ferromagnetic alloys of the present invention.

FIG. 5 shows two curves identifying two methods of checking the corrosion rate of material. The curve identified by the letter C shows the rate of weight change in micrograms per centimeter squared per day versus the atomic percentage of chromium added to the composition of the present invention. Curve D also represents the corrosion rate of the composition of the present invention considering the atomic percentage weight of chromium. The change in the dark field light scattering is measured in arbitrary units for curve D as an indication of the resultant corrosion of the alloy film of iron, cobalt and chromium according to the chromium content.

Several techniques have been used to study atmospheric corrosion. The classic works on corrosion of bulk metals has often used the weight change method to monitor the attack of the corrosion. Ellipsometry can yield valuable results on the rate of development of thin films of corrosion products. Auger spectroscopy has the capability of identifying the atomic corrosion products on the surface. The principle deficiency in the corrosion resistance of thin ferromagnetic films is the development of spots of corrosion products. These are not detected sensitively by either the weight or ellipsometry method. Instead, an optical measurement of roughness gives a better means of monitoring the corrosion. The optical method of measurement uses the amount of light scattered by a surface subject to a dark-field illumination on a microscope. An increase in roughness increases the light scattering provided that only a small fraction of the surface is destroyed. The condition that the examples of this invention were subjected for the corrosion tests are: temperature—25° C.; air velocity—$5 \times 10^{-2}$ miles per second; relative humidity—80%; and constitutents of the atmosphere—$SO_2, NO_2, O_3, H_2S, Cl_2$, with the remainder being purified air.

As shown in FIG. 5, increasing the chromium content of the alloy progressively reduces the amount of corrosion. The light scattering technique of measuring the corrosion shows that improvements are seen beyond 15% of the chromium because this measurement is a more sensitive measurement of the corrosion result. The data of curve D of FIG. 5 was obtained by measuring the light scattered by the sample to estimate the roughness increase caused by corrosion. The films are very smooth before corrosion. After exposure to the corrosive gas atmosphere, which is designed to accelerate the corrosion experienced in the typical application, the attack was in several areas of the surface. The greater the number of surface areas attacked or the greater their size, the greater is the quantity of light scattered by the sample. Thus, this measurement can be extrapolated as a function of a composition to obtain the amount of corrosion resulting from the exposure to the corrosive gases.

Figure 6:
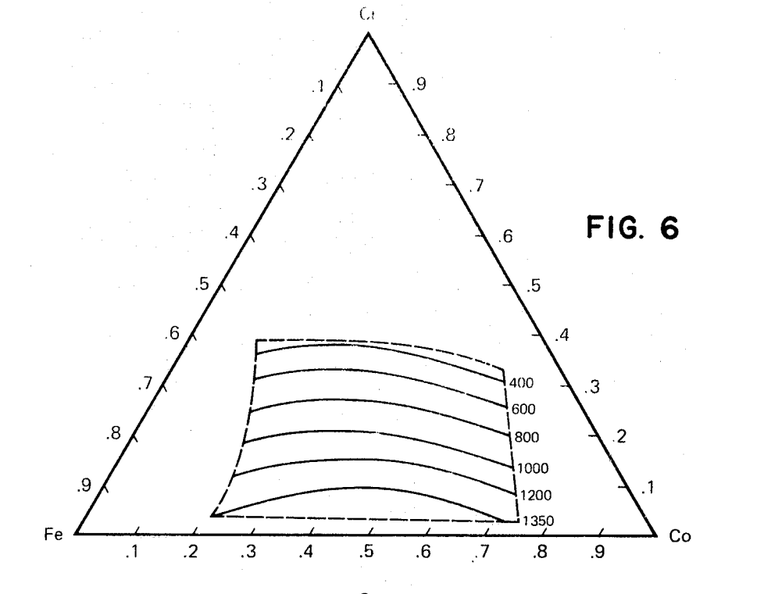
FIG. 6 is a ternary composition diagram of the saturation magnetization (in $EMU/cm^3$) of the alloy according to the present invention.
Figure 7:
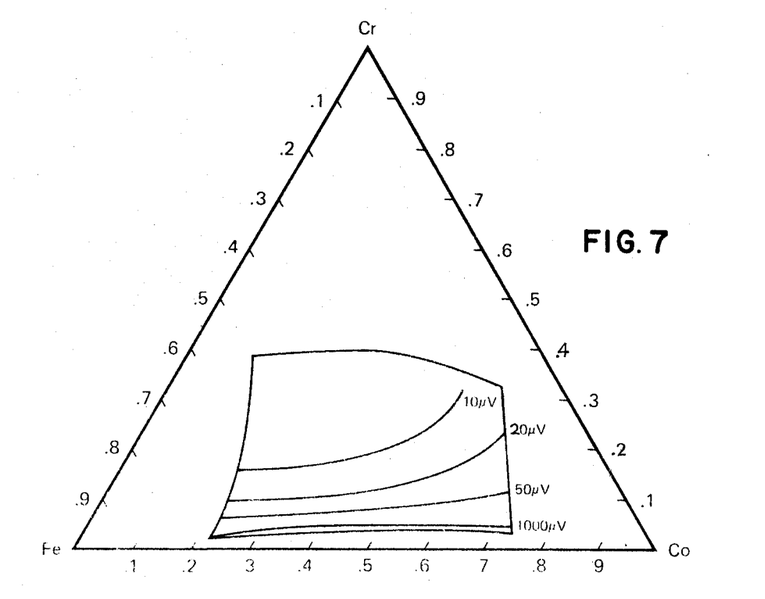
FIG. 7 is a ternary diagram of the corrosion susceptibility of the alloy according to the present invention.

FIG. 6 discloses the magnetization aspects of the composition alloys according to the present invention and FIG. 7 discloses the corrosion susceptibility of the same alloy film. In FIG. 7, it can be seen that for wide ranges of iron and cobalt ratios, an increase in the chromium content reduces the corrosion of the alloy film. The magnetization properties of the films at the higher chromium content is the limiting factor of the alloy at the upper range as is shown in FIG. 6.

Corrosion increases as the relative humidity increases. Corrosion is strongly dependent upon the atmospheric condition. Therefore, at 10% chromium, the alloy film corrodes somewhat in a stringent atmosphere but do not corrode significantly if the atmosphere is not as stringent, for instance, if the relative humidity was lower. Thus, the acceptable lower range of chromium is strongly dependent upon the conditions in which the magnetic recording media is used. The lesser the corrosive atmosphere, the lower the chromium necessary to provide a usable film for a magnetic recording media. For the standard perceived, about 8% chromium is believed to be the minimum that gives good results under the most standard atmospheric condition. The measurements of the weight change and the light scattering of samples exposed to various atmospheres varying in relative humidity and corrosive gas content, show that good corrosion resistance can be achieved by compositions with as much chromium as shown at FIG. 2 at line B. More severe atmospheres require more chromium content. Referring to FIG. 6, the magnetic moment Ms of $Fe_xCo_yCr_{1-y}$ can be represented as an explicit continuous function of the two independent variables, x and y. A projection of this curved surface is shown in FIG. 6. The dependence of saturation magnetization on composition was determined by measuring the magnetization and the composition of the examples. The saturation magnetization per unit volume was measured by the Faraday rotation method mentioned previously and by a vibrating sample magnetometer. The map of saturation magnetization as a function of composition obtained from the sets of data shown in FIG. 3A and 3B and other examples are given in FIG. 6.

The small spacing between the moving disk and the head makes the disk performance very sensitive to corrosion, because corrosion roughens the surface. Weight gain, electrochemistry, ellipsometry, auger spectroscopy and roughness measurements have been used to measure the dependence of corrosion on composition. The roughness measurements proved to be the most relevant and the most sensitive, although it is difficult to interpret the magnitude of observed changes. FIG. 7 shows the susceptibility of the iron cobalt chromium alloy films of the present invention to atmospheric corrosion when measured by the increase in roughness. The units of roughness are arbitrary. Large numbers signify a large increase in roughness which indicates substantial corrosion. The least change which is significant is in the order of ten units. Referring to FIG. 7, it is shown that $Fe_{44}CO_{44}Cr_{12}$ corrodes to the same extend as $Fe_{90}Cr_{10}$. Composition $Fe_{60\pm10}Co_{24\pm10}Cr_{16}$ would not corrode to the limits of our ability to detect corrosion by this measurement. FIG. 6 shows that films of the compositions that did not corrode will have magnetizations in the order of 1000 emu per centimeter cubed. Good squareness and coercivity has been observed in films of this type deposited at an angle of incidence.

Differences Between Bulk and Thin Film Behavior

Comparison of the different phases found in the thin magnetic film of the present invention with the published phase diagrams such as shown in the Metal Handbook, Volume 8, 2nd Edition, 1973, at page 419, is complicated because the film deposited is a quenched vapor whereas the phase diagrams refer to equilibrium, or at least furnace cooling, in most cases. Magnetic requirements restrict the range of interest to alloys with less than 25% chromium. In the solid solution of iron-cobalt, both the BCC and the FCC phases have high magnetic moments.

If the FCC phase solid solution which is stable at 1200 degrees centrigrade is quenched, these alloys can transform to the BCC phase or can retain the FCC structure. If they are cooled more slowly, the system will progress through phases represented by isotherms in this reference. Substantial fields of composition are 2-phase, and there are 3-phase regions.

The thin film of iron-chromium or iron-cobalt-chromium of the present invention for a magnetic recording layer cannot be predicted from the bulk properties of these materials as formerly known. This may be illustrated by the following examples.

$Ni_{80}Fe_{20}$ alloy films have been the subject of intense investigation. This is partly because the magnetic loop characteristics are peculiarly insensitive to the stress in the film. Yet, reviewing the magnetic properties of evaporated thin films of this material, E. W. Pugh *Physics of Thin Films*, Vol. 1 ed G. Hass p. 277–334 (A63) refers to the "nightmare of imperfections, impurities, and stresses which externally appear as shiny thin films". Effects of grain size, crystallographic preferred orientation, oriented Fe-Fe pairs, oriented dislocations, oriented defects, and high concentrations of quenched in defects have important effects which make it impossible to predict even static loop characteristics of films from bulk properties. B. D. Cullity, *Introduction to Magnetic Materials*, p. 428 Addison 1972, writes "The quantity of experimental work on the purely magnetic behavior of films far exceeds the work which is more difficult, on film structure. As a result, there is insufficient understanding of the relation between structure and magnetic behavior".

The situation is more complex for films of iron, cobalt and chromium alloys, in which magnetostriction, magneto crystalline anisotropy, exchange interactions; and ordering effects compound the problem of predicting film magnetic properties from bulk properties.

Figure 8:
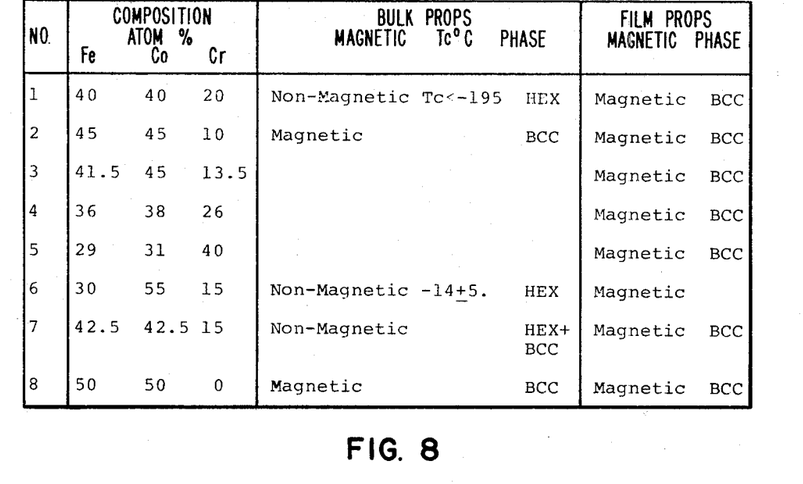
FIG. 8 is a table of example of the comparison between bulk properties and film properties of iron-cobalt-chromium.

The situation is even more extreme in the case of some films of iron-cobalt-chromium alloys which have different crystallographic phases from the bulk. FIG. 8 shows that for some compositions the bulk and film have the same phases, but in many cases, e.g., compositions #1, 6 and 7, the bulk material is a non-magnetic hexagonal phase while the film is magnetic and a body centered cubic phase.

Several cases may be cited in which bulk and thin film form of alloys with the same composition differ in corrosion resistance, e.g., $Co_{87}Cr_{13}$ is used in bulk form as a surgical implant and as a corrosion resistant metal for turbine blades, RF Morral *Corrosion* 25 307 (1969) T.

M. Devine, J. Wulff, J. Electrochem Soc 133, 1433 (1976), but we have found that thin films of this alloy corrode in the atmosphere at room temperature.

Considering the magnetic moment, there are several examples in which the bulk alloy is a cubic phase and magnetic, and the film made from it is also cubic and magnetic. The alloys 2 and 8 in FIG. 8 were made in both film and bulk form and both were magnetic and had a cubic crystal structure. There are also many cases in which the bulk alloy was found to be hexagonal and nonmagnetic, while the films were cubic and magnetic. For instance, the alloy of examples 1 and 7 in FIG. 8, were non-magnetic hexagonal material in bulk form and magnetic and cubic phase in thin film form.

The phases, magnetic properties and corrosion resistance of thin films cannot be inferred from the properties of bulk samples of the same composition.

The compositions of FIG. 8 are shown in FIG. 2 superimposed on the standard phase diagram. The compositions of numbers 1, 2, 3, 6 and 7 fall within the range of the present invention. All of the thin films within this range are magnetic and body centered cubic phase. For the bulk properties, these same compositions range from the body centered cubic to the hexagonal phase.

Figure 9:
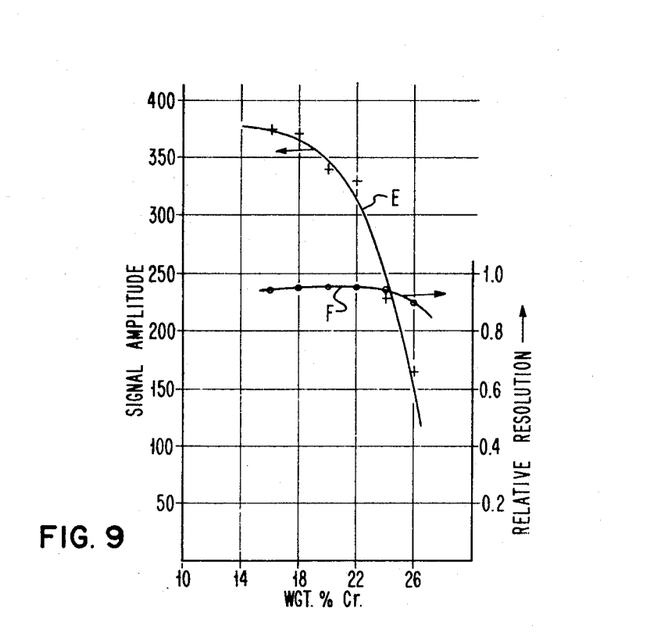
FIG. 9 is a graph showing the magnetic performance as a function of the chromium content of the alloy of the present invention.

FIG. 9 shows the maximum chromium content for the magnetic recording medium alloy of the present invention because, as is shown in FIG. 9, the magnetic properties of the media drop off at above 22% chromium. FIG. 9 shows a comparison of the signal amplitude in arbitrary units, curve E, and the relative resolution of the signal, curve F, versus the weight percentage of chromium in the alloy film. The recording signal amplitude is given in arbitrary units because the signal output itself is a function of the transducer and the transducer parameters such as the flying height of the transducer.

Curve F, the relative resolution, is also in arbitrary units. This curve shows that the resolution of an individual magnetic transition does not change substantially over a wide range of chromium content. Curve E shows a relatively stable signal amplitude output up to 22% chromium after which the signal amplitude decreases dramatically. If the chromium content of the alloy is greater than 22%, small fluctuations in the chromiun content in different areas of the same media will product large fluctuations in signal amplitude. Thus, it is belived that a film of iron-cobalt-chromium containing more than 22 atomic percentage of chromium would be an unreliable magnetic recording medium because expected inhomogenities in film composition would cause modulation of the recorded information which would be difficult to distinguish from the modulation which represents the recorded information.

Figure 10:
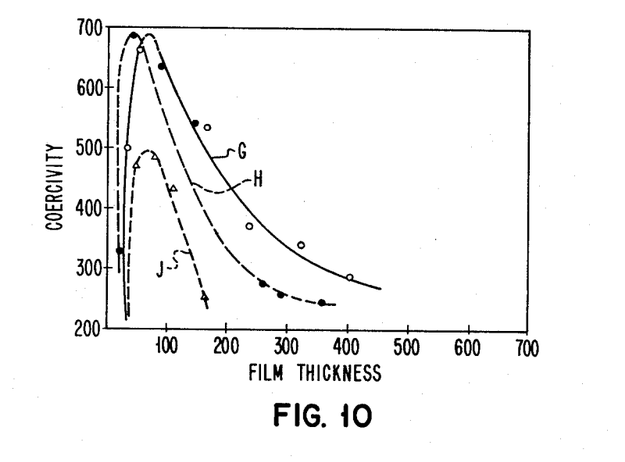
FIG. 10 is a graph showing the coercivity of films versus thickness for several angles of deposition.
Figure 11:
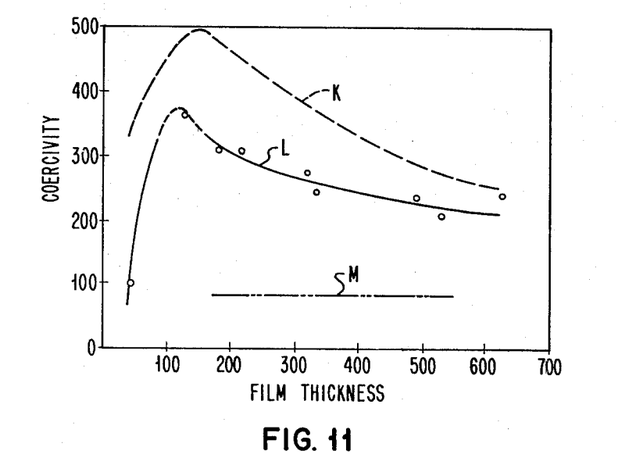
FIG. 11 is a graph showing the coercivity of film versus film thickness.

As stated previously, the magnetic properties of the thin magnetic recording films of this invention are dependent upon angle of deposition, undercoat composition and thickness. In FIGS. 10 and 11 are disclosed iron-chromium film at different compositions and oblique depsotion angles to show the interdependent effect of each in graphs of coercivity versus effective film thickness in Angstroms. Unless otherwise stated, the deposition was performed in a technical vacuum of $1 \times 10^{-6}$ to $3 \times 10^{-6}$ Torr, the approximate rate of deposition was at 60 Angstroms per second, and a substrate temperature of approximately 165° C.

The thickness dependence of the coercive force for deposition of $Fe_{89}Cr_{11}$ films on chromium is shown in FIG. 10. The three curves represent different oblique deposition angles. Curve G was deposited at a 55° angle of incidence; curve H was deposited at a 65° angle of incidence; and curve J was deposited at a 75° angle of incidence. The coercivity $H_c$ is expressed in oersteds and the film thickness is given in Angstroms for both FIGS. 10 and 11. From FIG. 10, it is shown that the coercivity of the films peaks at low film thicknesses.

For FIG. 11, the depositions for three compositions were made on the cobalt superalloy undercoat and the coercivity was checked versus film thickness. The depositions were carried out at a 65° angle of incidence. Curve K was drawn from data using a composition of $Fe_{89}Cr_{11}$; curve L was drawn using a composition of $Fe_{84}Cr_{16}$; and curve M was drawn using a composition of $Fe_{65}Cr_{35}$. As the chromium content of the alloy increased, the coercivity decreased. The difference was also dependent upon film thickness. At a very high chromium content of 35 weight percentage as shown in curve M, a coercivity of about 80 oersted was produced that was independent of film thickness.

From iron-chromium films, the best results were obtained using a chromium content above 10% to avoid corrosion and below 18% to avoid the rapid degeneration of the shape anisotropy mechanism due to the high volatility of the chromium. The iron-chromium films are ideally suited as a magnetic recording media and show an outstanding combination of high amplitude and high resolution. A recording media was produced with a magnetic layer having an alloy of $Fe_{88}Cr_{12}$ at a film thickness of 400 Angstroms. The magnetic layer was deposited at an angle of incidence of 60° and a substrate temperature of 165° C. The magnetic layer was deposited over a undercoat layer of chromium of a thickness of 2000 Angstroms. An overcoat layer of rhodium was deposited over the magnetic layer. The media had a remanence $M_sT$ of 3.78 to $3.80 \times 10^{-3}$ emu/cm$^2$, a coercivity $H_c$ of 350-380 oersteds, a squareness ratio S of 0.88 to 0.93, with an output signal amplitude of 583 microvolts and a 98 percent solution.

The principles of the present invention have now been made clear in an illustrative embodiment. There will be immediately obvious to those skilled in the art many modifications of structure, arrangement, proportion, the elements, materials and components used in the practice of the invention. For instance, many different materials are usable for the substrate, clad layer, undercoat layer, and overcoat layer of the media shown in FIG. 1. Further, the exact range of chromium content from 8-22% by atomic weight is believed to be an approximation and any small changes from within these ranges are believed to be well within those skilled in the art based upon the limitations of measuring techniques prsently available. The appended claims are, therefore, intended to cover and embrace any such modification, within the limits only of the true spirit and scope of the invention.

Having thus described our invention, what we claim as new, and desire to secure by Letters Patent is:

1. A recording media for storing magnetic transitions representative of data information over an extended portion, said media comprising:
   a substrate;
   an undercoat layer deposited on said substrate;
   a thin film layer of ferromagnetic material deposited on said undercoat layer, said ferromagnetic material consisting essentially of, in weight percentage from 0-55% cobalt, from 8-22% chromium, with the remainder being mainly iron;

said thin film having a remanent magnetization product of remanence $M_r$ times the thickness of said layer (t) greater than $1 \times 10^{-3}$ emu/cm$^2$;

said layer having a thickness between 300 and 600 angstroms;

said layer having a coercivity $H_c$ between 300 and 800 oersteds; and an overcoat protective layer deposited over said ferromagnetic material thin film layer.

2. A recording layer as defined in claim 1 wherein the ratio of iron to cobalt is 1:1.

3. A recording layer as defined in claim 1 comprising from 10–18% of chromium with the ratio of iron to cobalt being 1:1.

4. A recording layer as defined in claim 1 essentially comprising 43% cobalt, 43% iron and 14% chromium.

5. A recording layer as defined in claim 1 comprising from 10–20% chromium with the remainder being mainly iron.

6. A recording layer as defined in claim 1 comprising from 14–18% chromium with the remainder being mainly iron.

* * * * *